United States Patent [19]

Chou et al.

[11] Patent Number: 5,019,459
[45] Date of Patent: May 28, 1991

[54] HIGH TEMPERTURE CORROSION RESISTANT BIMETALLIC CYLINDER

[75] Inventors: Schiao F. Chou, Pulaski; Willie Roberson, Blacksburg, both of Va.

[73] Assignee: Xaloy Incorporated, Pulaski, Va.

[21] Appl. No.: 505,159

[22] Filed: Apr. 5, 1990

[51] Int. Cl.$^5$ .................... C22C 30/00; C22C 19/03; B32B 15/00
[52] U.S. Cl. .................... 428/656; 420/431; 420/441; 420/442; 420/454; 420/459; 420/580; 420/581; 420/585; 420/588; 428/665; 428/679
[58] Field of Search ............... 420/580, 585, 431, 441, 420/452, 459; 428/665, 679, 656, 586, 680; 427/234, 241; 425/543

[56] References Cited

U.S. PATENT DOCUMENTS

| | | |
|---|---|---|
| 1,847,617 | 3/1932 | Prinz zu Lowenstein et al. ........................... 420/431 |
| 3,836,341 | 9/1974 | Saltzman et al. ................... 428/547 |
| 4,103,800 | 8/1978 | Lomax et al. ........................ 428/679 |
| 4,430,389 | 2/1984 | Otani ................................. 420/431 |

FOREIGN PATENT DOCUMENTS 164070 8/1976 Czechoslovakia .

*Primary Examiner*—R. Dean
*Assistant Examiner*—Robert R. Koehler
*Attorney, Agent, or Firm*—Ostrolenk, Faber, Gerb & Soffen

[57] ABSTRACT

A high temperture, bimetallic cylinder of either ASTM 193B-16 carbon steel or duplex stainless steel having a wear and corrosion resistant inlay or liner of a nickel-based alloy containing 1.5 to 4.5% carbon, 1.5 to 3.5% silicon, 1.0 to 3.0% boron, up to 7.0% chromium, up to 15% iron, 1.0 to 6.0% cobalt and 30 to 60% tungsten. The inlay is centrifugally cast within the cylinder which is thermally compatible with the inlay such that it retains a high yield strength after casting.

16 Claims, No Drawings

HIGH TEMPERTURE CORROSION RESISTANT BIMETALLIC CYLINDER

BACKGROUND OF THE INVENTION

1. Field of the Invention

In the plastics industry, screws and cylinders are used in various injection molding processes to produce plastic articles. This invention relates to a high strength bimetallic cylinder used in these processes.

2. Description of the Related Art

In an injection molding process, solid plastic resin is heated and liquefied inside a hollow cylinder by heater bands that envelop the cylinder. The molten plastic is pressurized and conveyed into a heated zone inside the cylinder by a rotating screw. This heated zone is ahead of a check ring on the head of the screw and has a definite volume predetermined according to the plastic article to be made. Then a forward movement of the screw and check ring inside the cylinder injects this volume of plastic into a mold cavity. During this forward movement, the pressure inside the cylinder on the discharge end can be as high as 30,000 psi.

Apparently, the cylinder has to have the strength to take the high pressure of injection. Besides, such a cylinder has to have a good resistance to wear and corrosion by the heated plastic resin. If the bore of the cylinder is enlarged due to wear or corrosion, the plastic will leak back through the increased clearance between the screw and cylinder bore surface. As a result, the proper pressure and injection action cannot be maintained.

One approach to make such a cylinder is to make it out of a heat treated high strength steel. The inner bore surface is nitrided to provide adequate wear resistance. However, the nitrided layer is only 0.005 to 0.020 inches deep, and the concentration of nitride decreases with the depth rapidly. The wear resistance of the nitrided surface will drop quickly with time as the very hard top surface is worn. Furthermore, such a cylinder has a poor corrosion resistance to various corrosive polymers, such as fluoropolymer, and will become useless after a few months' operation.

A second approach is to cast a hard, wear resistant alloy inside a hollow steel cylinder by a centrifugal casting process. The melting point of the alloy to be cast is lower than that of the steel by a few hundred degrees Fahrenheit. In this process, the alloy is loaded inside the hollow cylinder and the ends of the cylinder are sealed. The cylinder is then placed in a furnace at a temperature high enough to melt the alloy but sufficiently lower than the melting point of the steel. The steel cylinder is then rotated rapidly about its axis to distribute the molten alloy into a continuous layer about the inside of the cylinder. Upon cooling, this molten alloy solidifies and metallurgically bonds to the steel bore to form a hard, wear resistant inlay. This inlay then is honed to the correct diameter and surface finish.

In processing various corrosive plastics, the inlay is made of nickel or cobalt alloys, which have very good corrosion resistance as well as wear resistance. The thickness of the cast inlay is about 0.060 to 0.125 inches, much thicker than that of the nitrided layer. The chemical composition, corrosion resistance, hardness, and wear resistance are uniform across the entire inlay thickness. The excellent wear and corrosion resistance of this type of inlay makes the cylinder last 5 to 10 times that of a nitrided barrel. The bimetallic cylinder has gained its popularity in the plastic industry over the years. However, it does have a weakness. The excessive heating during the casting process causes tremendous grain growth in the microstructure of the cylinder steel. Additionally, all corrosion resistant nickel or cobalt based inlay alloys require slow cooling after casting to avoid cracking because of their brittle nature and poor resistance to thermal shock. As a result, the steel typically has a very coarse pearlitic structure and has poor strength.

Facing the increasing demand of higher pressure for the injection molding process, the bimetallic cylinder often cannot hold the pressure required. The solution to this problem is to adopt a sleeve design on the discharge end, which is the high pressure end. After a bimetallic cylinder is cast, an outer steel cylinder, a sleeve, made of strong heat treated steel is put on the discharge end of the bimetallic cylinder with a shrinkage fit, i.e., the inner diameter of the sleeve is smaller than the outer diameter of the bimetallic cylinder by a few thousandths of an inch. The sleeve is put on the high pressure end of the bimetallic cylinder after the sleeve is heated to 500° F. to 700° F. to expand it while the bimetallic cylinder is kept at room temperature. The sleeve produces a compressive stress on the bimetallic cylinder and increases the pressure carrying capacity of the cylinder.

This design not only increases the cost of the product but also sometimes causes operational problems. At times, plastic at the discharge end can be forced into the crevice between the sleeve and the inner bimetallic cylinder during operation resulting in collapsing of the cylinder bore. The screw inside will then be seized, and the operation has to be terminated. Furthermore, the sleeve only strengthens the discharge end of the cylinder. The pressure can also build up away from the discharge end. This pressure can be significant if the machine goes through a cold start procedure. The region not protected by the sleeve then will crack due to overpressurization.

Another approach to strengthen the bimetallic cylinder is to heat treat the bimetallic cylinder to increase the strength of the steel. However, all the existing nickel or cobalt alloys, which have good corrosion and wear resistance, will crack in any heat treating process.

Overall, the following have to be satisfied to make a strong bimetallic cylinder with good corrosion and wear resistance:

1. The steel has to be thermally compatible with the inlay.
2. The inlay has to have good corrosion and wear resistance.
3. The inlay has to be strong and free of defects.
4. The steel has to have high strength after the centrifugal casting process.

If the steel is not thermally compatible with the inlay, the excessive thermal stress created during cooling will crack the inlay. The inlays made by centrifugal casting generally are quite strong due to their high hardness. However, they typically have microcracks in their dendritic casting structure. These microcracks can open up and propagate. If an inlay has many such microcracks of significant length, the bimetallic cylinder will have poor pressure carrying capacity.

The pressure carrying capacity of a cylinder is critically determined by the yield strength of the steel. The inlays are hard and brittle and do not allow any plastic deformation. The strain at the fracture point is about 0.15 to 0.25% Once the steel yields, the inlay will crack.

Generally speaking, if the steel has a higher yield strength, the cylinder will have a higher pressure carrying capacity.

SUMMARY OF THE INVENTION

It is an object of the invention to provide a bimetallic cylinder which avoids the need for a nitrided layer or a sleeve but yet has good wear and corrosion resistance and is stronger than known bimetallic cylinders.

This objective, and other objectives, are achieved by providing a cylinder of either ASTM 193B-16 carbon steel or duplex stainless steel that has a corrosion and wear resistant, nickel-based alloy inlay having the following ingredients in approximately the proportions set forth below:

| Ingredient | Weight Percent |
|---|---|
| Carbon | 1.5 to 4.5 |
| Silicon | 1.5 to 3.5 |
| Boron | 1.0 to 3.0 |
| Cobalt | 1.0 to 6.0 |
| Tungsten | 30.0 to 60.0 |

Preferably, the nickel-based alloy inlay comprises the following ingredients in approximately the proportions set forth below:

| Ingredient | Weight Percent |
|---|---|
| Carbon | 2.0 to 3.5 |
| Silicon | 1.5 to 3.0 |
| Boron | 1.0 to 3.0 |
| Cobalt | 3.0 to 6.0 |
| Tungsten | 35.0 to 50.0 |

The inlay optionally includes up to 7.0 wt. % chromium and up to 15 wt. % iron. The duplex stainless steel is preferably Ferralium 255 or Carpenter 7-Mo steel. The alloy inlay most preferably comprises approximately: 2.35% carbon, 1.89% silicon, 1.26% boron, 3.07% chromium, 9.79% iron, 5.0% cobalt, 39.24% tungsten and 37.4% nickel.

DETAILED DESCRIPTION OF THE PREFERRED EMBODIMENTS

The inlay of the invention is a nickel based alloy containing various carbides and borides and is known as "X-800" which is available from the assignee of the present invention. This inlay has a very good corrosion resistance because of its high nickel and chromium contents. Field experience shows that it has good corrosion resistance in processing the most corrosive polymer.

The high contents of carbide and boride provide high resistance to wear. Most critically, the microstructure of this inlay is free of microcracks which can decrease the pressure carrying capacity. Table 1 below shows the chemical composition of the inlay alloy in weight percentage with the preferred weight percentage in parenthesis. All references to percentage are weight percent unless otherwise specified.

TABLE 1

| C | Si | B | Cr | Fe |
|---|---|---|---|---|
| 1.5–4.5 | 1.5–3.5 | 1.0–3.0 | up to 7.0 | up to 15.0 |
| (2.0–3.5) | (1.5–3.0) | (same) | (same) | (same) |
| Co | W | Ni | | |
| 1.0–6.0 | 30–60 | balance | | |

TABLE 1-continued

| | |
|---|---|
| (3.0–6.0) | (35.0–50.0) |

Most preferably, the inlay alloy has the following composition: 2.35% carbon, 1.89% silicon, 1.26% boron, 3.07% chromium, 9.79% iron, 5.0% cobalt, 39.24% tungsten and 37.4% nickel.

Most importantly, this bimetallic cylinder does not employ a high strength sleeve or heat treatment to acquire its high strength. The strength of the cylinder comes from combining the above-described inlay with a particular type of steel which the Applicants have found retains a high yield strength even after the severe heating and slow cooling involved in the centrifugal casting of the inlay in the cylinder. The steels are ASTM 193B-16 carbon steel and duplex stainless steel, preferably Ferralium 255 or Carpenter 7-Mo plus stainless steel. These steels are thermally compatible with the inlay mentioned above so that they retain a high yield strength after casting. The chemical composition of these steels are shown in Table 2 below.

TABLE 2

| | 193B-16 | Ferralium 255 | 7-Mo Plus Stainless Steel |
|---|---|---|---|
| C | 0.36–0.47 | 0.04 max | 0.03 max |
| Mn | 0.45–0.7 | 1.50 max | 2.00 max |
| P | 0.035 | 0.04 max | 0.035 max |
| S | 0.040 | 0.03 max | 0.01 max |
| Si | 0.15–0.035 | 1.00 max | 0.60 max |
| Cr | 0.8–1.15 | 24–27 | 26–29 |
| Ni | | 4.5–6.5 | 3.5–5.2 |
| Mo | 0.5–0.65 | 2.9–3.9 | 1.0–2.5 |
| N | | 0.1–0.25 | 0.15–0.35 |
| V | 0.25–0.35 | | |
| Cu | | 1.5–0.25 | |

Injection molding process temperatures can be as high as 750° F. to 800° F. High temperature, yield strength and tensile strength of these steels in an as cast condition were determined (see Table 3). Tensile specimens were cut from bimetallic cylinders made out of these steels. As can be seen, the yield strength (Y.S.) and tensile strength (T.S.) of these two steels are significantly higher than other steels, for example that of AISI 4140 steel.

TABLE 3

| Room | 4140 | | 193B-16 | | Ferralium 255 | |
|---|---|---|---|---|---|---|
| Temp | Y.S.(psi) | T.S. | Y.S. | T.S. | Y.S. | T.S. |
| | 54,400 | 108,100 | 97,600 | 138,900 | 123,000 | 149,000 |
| 600° F. | 50,700 | 106,800 | 90,200 | 127,300 | 88,500 | 121,500 |
| 700° F. | | | 82,200 | 117,000 | 82,100 | 116,000 |
| 750° F. | 47,600 | 94,200 | 82,400 | 116,900 | | |
| 850° F. | 45,200 | 82,700 | 79,500 | 108,700 | 79,800 | 108,100 |

The following examples were carried out in order to demonstrate the superior pressure carrying capacity of the bimetallic cylinder of the present invention in comparison with common bimetallic cylinders. Examples 1 and 3 show bimetallic cylinders in accordance with the invention. Comparative Example 2 shows a bimetallic cylinder of ASTM 193B-16 steel with an iron-based alloy inlay. Comparative Example 4 shows a bimetallic cylinder of AISI 4140 steel with an inlay as shown in Table 1.

EXAMPLE 1

An alloy having the following composition was loaded into an ASTM 193B-16 steel cylinder: 2.35% carbon, 1.89% silicon, 1.26% boron, 3.07% chromium, 9.79% iron, 5.0% cobalt, 39.24% tungsten and 37.4% nickel. The cylinder was pre-bored to a dimension of 0.124 inches over a finished inner diameter of 1.650 inches. Centrifugal casting was performed as follows. The cylinder was heated to a temperature of 2200° F. and inlay alloy was cast inside the cylinder. The cylinder was cooled in 48 hours to room temperature, and then honed, and machined to a size of 1.650 inches I.D. ×5.078 inches O.D. ×24.000 inches length. The inlay hardness was RC 62, and the hardness of the cylinder steel was RC 30. The cylinder was then subjected to a hydraulic pressure test. The cylinder failed at an internal pressure of 60,000 psi; the inlay fractured and the hydraulic fluid leaked, but the crack did not extend into the steel. The hoop stress at the failure was 74,155 psi.

EXAMPLE 2

A cylinder of 193B-16 steel was prepared as in Example 1 except the inlay alloy had the following composition; this inlay is commonly used for bimetallic cylinders.

| C | Mn | Si | Ni | Cr | B | Fe |
|---|---|---|---|---|---|---|
| 3.0 | 1.2 | 0.7 | 3.5 | 1.0 | 0.8 | Balance |

However, the pressure test result showed the cylinder failed at a hoop stress of 51,000 psi. The significantly lower pressure carrying capacity of this cylinder with the same backing steel is related to the presence of sharp microcracks in the inlay.

EXAMPLE 3

A cylinder of Ferralium 255 duplex stainless steel with the same inlay as that in Example 1 was centrifugally cast the same way. The inlay hardness was RC 60-62, and the hardness of the backing steel was RC 30. The yield strength and tensile strength of the cylinder steel at different temperatures are shown in Table 3.

EXAMPLE 4

A regular bimetallic cylinder with the commonly used AISI 4140 steel was made. The inlay alloy was the same as that in Example 1. The hardness of the inlay was RC 60-62. However, the hardness of the cylinder steel was only RB90 or roughly RC 10. In the pressure test, the cylinder failed at a hoop stress of 50,000 psi.

While certain representative embodiments and details have been shown for the purpose of illustrating the invention, it will be apparent to those skilled in the art that various changes may be made therein without departing from the spirit or scope of the invention.

What is claimed is:

1. A cylinder for an injection molding machine, said cylinder being formed of a steel selected from the group consisting of ASTM 193B-16 carbon steel and duplex stainless steel, and having a corrosion and wear resistant, carbide-and boride-containing, alloy inlay comprising the following ingredients in approximately the proportions set forth below:

| Ingredient | Weight Percent |
|---|---|
| Carbon | 1.5 to 4.5 |
| Silicon | 1.5 to 3.5 |
| Boron | 1.0 to 3.0 |
| Cobalt | 1.0 to 6.0 |
| Tungsten | 30.0 to 60.0 |
| Nickel | balance |

2. The cylinder of claim 1, wherein said inlay comprises the following ingredients in approximately the proportions set forth below:

| Ingredient | Weight Percent |
|---|---|
| Carbon | 2.0 to 3.5 |
| Silicon | 1.5 to 3.0 |
| Boron | 1.0 to 3.0 |
| Cobalt | 3.0 to 6.0 |
| Tungsten | 35.0 to 50.0 |
| Nickel | Balance. |

3. The cylinder of claim 1, further comprising chromium in said inlay, the chromium being present in an amount of not more than about 7.0 wt. %.

4. The cylinder of claim 3, further comprising iron in the inlay, the iron being present in an amount of not more than about 15.0 wt. %.

5. The cylinder of claim 1, further comprising iron in the inlay, the iron being present in an amount of not more than about 15.0 wt. %.

6. The cylinder of claim 1, wherein said steel is ASTM 193B-16 carbon steel.

7. The cylinder of claim 1, wherein said steel is duplex stainless steel.

8. The cylinder of claim 7, wherein said duplex stainless steel is selected from the group consisting of: (1) steel comprising carbon in an amount not more than 0.04 wt. %, manganese in an amount not more than 1.50 wt. %, phosphorous in an amount not more than 0.04 wt. %, sulfur in an amount not more than 0.03 wt. %, silicon in an amount not more than 1.00 wt. %, 24–27 wt. % chromium, 4.5–6.5 wt. % nickel, 2.9–3.9 wt. % molybdenum, 0.1–0.25 wt. % nitrogen and 1.5–0.25 wt. % copper; and (2) steel comprising carbon in an amount not more than 0.03 wt. %, manganese in an amount not more than 2.00 wt. %, phosphorous in an amount not more than 0.035 wt. %, sulfur in an amount not more than 0.01 wt. %, silicon in an amount not more than 0/06 wt. %, 26–29 wt. % chromium, 3.5–5.2 wt. % nickel, 1.0–2.5 wt. % molybdenum and 0.15–0.35 wt. % nitrogen.

9. The cylinder of claim 8, wherein said duplex stainless steel comprises carbon in amount not more than 0.04 wt. %, manganese in an amount not more than 1.5 wt. %, phosphorous in an amount not more than 0.04 wt. %, sulfur in an amount not more than 0.03 wt. %, silicon in an amount not more than 1.00 wt. %, 24–27 wt. % chromium, 4.5–6.5 wt. % nickel, 2.9–3.9 wt. % molybdenum, 0.1–0.25 wt. % nitrogen and 1.5–0.25 wt. % copper.

10. The cylinder of claim 8, wherein said duplex stainless steel comprises carbon in an amount not more than 0.03 wt. %, manganese in an amount not more than 2.00 wt. %, phosphorous in an amount not more than 0.035 wt. %, sulfur in an amount not more than 0.01 wt. %, silicon in an amount not more than 0.60 wt. %, 26–29 wt. % chromium, 3.5–5.2 wt. % nickel, 1.0–2.5 wt. % molybdenum, and 0.15–0.35 wt. % nitrogen.

11. A cylinder for an injection molding machine, said cylinder being formed of a steel selected from the group consisting of ASTM 193B-16 carbon steel and duplex stainless steel, and having a corrosion and wear resistant alloy inlay consisting essentially of the following ingredients in approximately the proportions set forth below:

| Ingredient | Weight Percent |
|---|---|
| Carbon | 2.35 |
| Silicon | 1.89 |
| Boron | 1.26 |
| Chromium | 3.07 |
| Iron | 9.79 |
| Cobalt | 5.00 |
| Tungsten | 39.24 |
| Nickel | 37.40. |

12. The cylinder of claim 11, wherein said steel is ASTM 193B-16 carbon steel.

13. The cylinder of claim 11, wherein said steel is duplex stainless steel.

14. The cylinder of claim 13, wherein said duplex stainless steel is selected from the group consisting of: (1) steel comprising carbon in an amount not more than 0.04 wt. %, manganese in an amount not more than 1.50 wt. %, phosphorous in an amount not more than 0.04 wt. %, sulfur in an amount not more than 0.03 wt. %, silicon in an amount not more than 1.00 wt. %, 24-27 wt. % chromium, 4.5-6.5 wt. % nickel, 2.9-3.9 wt. % molybdenum, 0.1-0.25 wt. % nitrogen and 1.5-0.25 wt. % copper; and (2) steel comprising carbon in an amount not more than 0.03 wt. %, manganese in an amount not more than 2.00 wt. %, phosphorous in an amount not more than 0.035 wt. %, sulfur in an amount not more than 0.01 wt. %, silicon in an amount not more than 0.60 wt. %, 26-29 wt. % chromium, 3.5-5.2 wt. % nickel, 1.0-2.5 wt. % molybdenum and 0.15-0.35 wt. % nitrogen.

15. The cylinder of claim 14, wherein said duplex stainless steel comprises carbon in an amount not more than 0.04 wt. %, manganese in an amount not more than 1.5 wt. %, phosphorous in an amount not more than 0.04 wt. %, sulfur in an amount not more than 0.03 wt. %, silicon in an amount not more than 1.00 wt. %, 24-27 wt. % chromium, 4.5-6.5 wt. % nickel, 2.9-3.9 wt. % molybdenum, 0.1-0.25 wt. % nitrogen and 1.5-0.25 wt. % copper.

16. The cylinder of claim 14, wherein said duplex stainless steel comprises carbon in an amount not more than 0.03 wt. %, manganese in an amount not more than 2.00 wt. %, phosphorous in an amount not more than 0.035 wt. %, sulfur in an amount not more than 0.01 wt. %, silicon in an amount not more than 0.60 wt. %, 26-29 wt. % chromium, 3.5-5.2 wt. % nickel, 1.0-2.5 wt. % molybdenum and 0.15-0.35 wt. % nitrogen.

* * * * *